(12) United States Patent
Noda et al.

(10) Patent No.: US 6,701,268 B2
(45) Date of Patent: Mar. 2, 2004

(54) METHOD FOR CALIBRATING SCANNING PROBE AND COMPUTER-READABLE MEDIUM THEREFOR

(75) Inventors: Takashi Noda, Kawasaki (JP); Hiromi Deguchi, Kawasaki (JP); Koji Takesako, Kawasaki (JP)

(73) Assignee: Mitutoyo Corporation, Kawasaki (JP)

( * ) Notice: Subject to any disclaimer, the term of this patent is extended or adjusted under 35 U.S.C. 154(b) by 11 days.

(21) Appl. No.: 10/265,027

(22) Filed: Oct. 4, 2002

(65) Prior Publication Data

US 2003/0069709 A1 Apr. 10, 2003

(30) Foreign Application Priority Data

Oct. 4, 2001 (JP) .......................... 2001-308698

(51) Int. Cl.[7] ............................... G06F 19/00
(52) U.S. Cl. .................... 702/95; 702/94; 702/104; 33/503; 33/559
(58) Field of Search ................ 762/104, 94, 95; 33/503, 559

(56) References Cited

U.S. PATENT DOCUMENTS 4,875,177 A   10/1989   Jarman

*Primary Examiner*—John Barlow
*Assistant Examiner*—Anthony T Dougherty
(74) *Attorney, Agent, or Firm*—Rankin, Hill, Porter & Clark LLP

(57) ABSTRACT

After preparatory measurement of a calibration reference with a scanning probe is performed, apart program for measuring the calibration reference is generated and executed so as to perform calibration measurement. After a calibration value of a coordinate transformation function and reference coordinates of the calibration reference are obtained, a new part program for measuring the calibration reference again is generated by use of the calibration value and the reference transformation coordinates and the part program is executed to perform calibration measurement. Accordingly, the calibration value of the coordinate transformation function and the reference coordinates of the calibration reference can be obtained with higher accuracy.

9 Claims, 8 Drawing Sheets

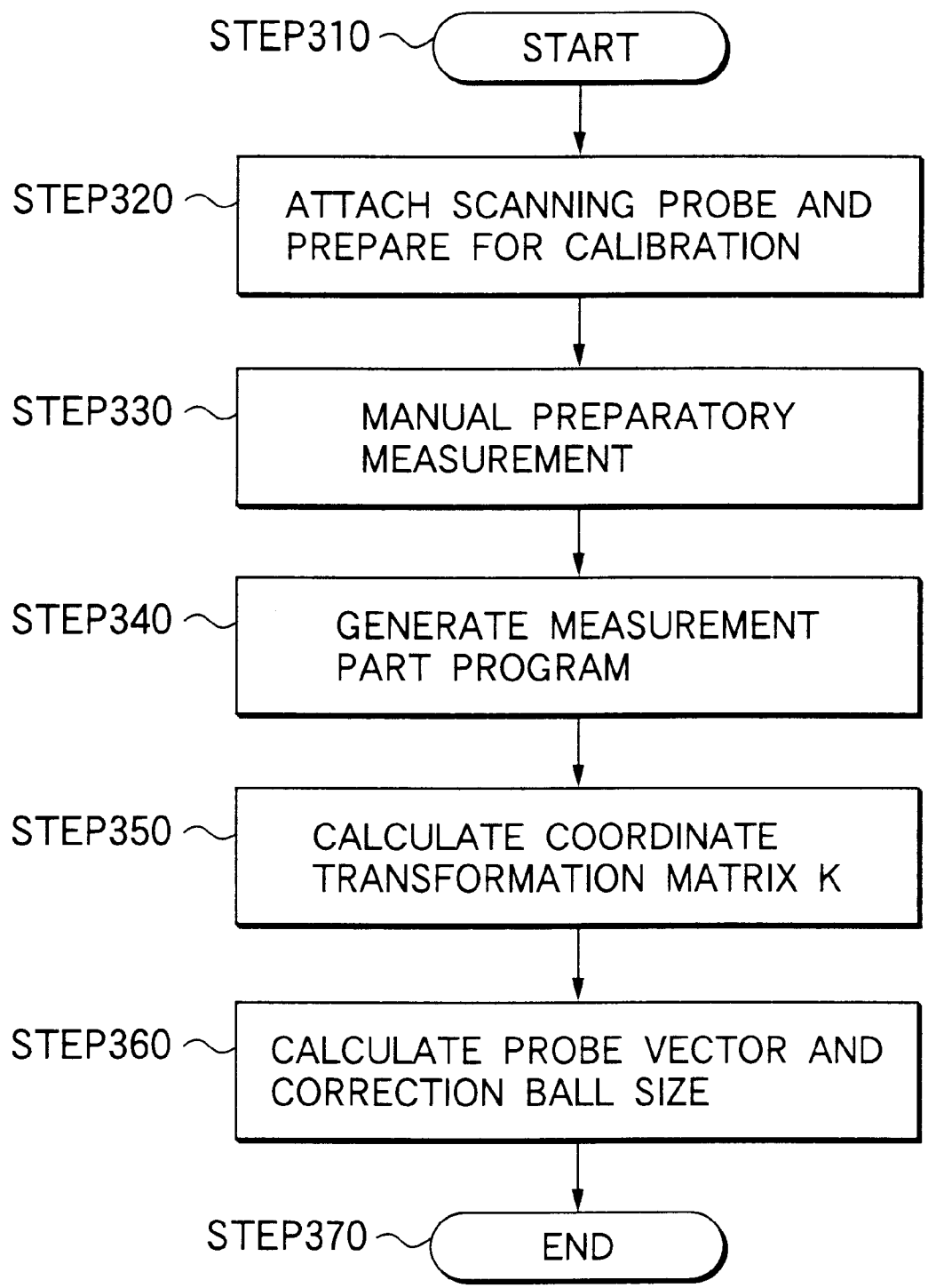

METHOD FOR CALIBRATING SCANNING PROBE AND COMPUTER-READABLE MEDIUM THEREFOR

BACKGROUND OF THE INVENTION

1. Field of the Invention

The present invention relates to a method for calibrating a scanning probe and a computer-readable medium therefore, and particularly to a method for calibrating error of a scanning probe measuring surface texture such as size, shape, undulation, roughness, etc. of a work and a computer-readable medium therefor.

2. Description of the Related Art

There are known surface texture measuring machine for measuring a contour, roughness, undulation, etc. of a surface of a work, such as a Coordinate Measuring Machine (hereinafter, referred to CMM) for measuring the three-dimensional shape of a work, a contour measuring machine or vision measuring machine for measuring a two-dimensional contour of a work, a roundness measuring machine for measuring a roundness of a work, a surface roughness tester for measuring waviness, roughness, etc. of a surface of a work, and so on. In most cases, each of these machines has a uniaxial or multiaxial guide mechanism for moving the work relatively to a contact type or non-contact type sensor.

The guide mechanism has a guide, a feed screw, and a nut thread-engaged with the feed screw. The guide mechanism moves a slider connected to the nut. In most cases, the movement of the slider is measured with a linear scale or the like.

The guide mechanism need not have a feed screw. That is, the guide mechanism may have a guide, and a slider, in which a displacement quantity of the slider moved manually is read by a linear scale or the like. Generally, at least one kind of sensor such as a probe or a CCD camera is attached to the slider. Probes used for these applications are classified into touch signal probes and scanning probes.

FIG. 6 shows an example of use of a scanning probe 118 attached to a forward end of a spindle 117 in a CMM 100.

The CMM 100 is configured as follows. A measuring table 112 is placed on a vibration isolating stand 111 so that an upper surface of the measuring table 112 forms a base plane coincident with a horizontal plane. A beam 114 extended in an X-axis direction is supported at upper ends of beam supports 113a and 113b erected from opposite side ends of the measuring table 112. A lower end of the beam support 113a is driven in a Y-axis direction by a Y-axis drive mechanism 115. A lower end of the beam support 113b is supported by an air bearing so that the beam support 113b can move in the Y-axis direction relatively to the measuring table 112. The current position of the moved beam supports 113a and 113b is detected by a Y-axis scale 245.

The beam 114 supports a column 116 extended in a vertical direction (Z-axis direction). The column 116 is driven along the beam 114 in the X-axis direction. The current position of the moved column 116 is detected by an X-axis scale 244. The column 116 is provided with the spindle 117 so that the spindle 117 is driven along the column 116 in the Z-axis direction. The current position of the moved spindle 117 is detected by a Z-axis scale 246.

The scanning probe 118 having a stylus 119 and a contact ball 121 is attached to a lower end of the spindle 117. The probe 118 measures a work placed on the measuring table 112. For example, an optical linear scale or the like is used as each of the X-axis scale 244, the Y-axis scale 245 and the Z-axis scale 246.

As shown in FIG. 7 which is a block diagram, an X-axis sensor 251, a Y-axis sensor 252 and a Z-axis sensor 253 are built into the scanning probe 118. The sensors 251 to 253 output the quantities of displacement of the scanning probe 118 in accordance with the displacement of the stylus 119 of the scanning probe 118 in the X-axis, Y-axis and Z-axis directions respectively.

A drive unit 260 has an x-axis drive circuit 261 for driving an X-axis drive mechanism 105, a Y-axis drive circuit 262 for driving the Y-axis drive mechanism 115, a Z-axis drive circuit 263 for driving a Z-axis drive mechanism 125, an X-axis counter 264 for counting the output of the X-axis scale 244, a Y-axis counter 265 for counting the output of the Y-axis scale 245, a Z-axis counter 266 for counting the output of the Y-axis scale 246, an X-axis P counter 267 for counting the output of the X-axis sensor 251, a Y-axis P counter 268 for counting the output of the Y-axis sensor 252, and a Z-axis P counter 269 for counting the output of the Z-axis sensor 253. The respective members of the drive unit 260 are connected to a computer 270.

Hence, each of the X, Y and Z axes in the CMM 100 can be positioned in any position at any speed on the basis of an instruction given from the computer 270. Further, the computer 270 is formed so that the current position of the spindle 117 in the X, Y and Z axes and the current displacement of the measurer 119 of the scanning probe 118 can be found when the respective count values of the counters 264 to 269 are input into the computer 270.

The computer 270 has a connection unit not shown but for exchanging information with the drive unit 260. Other constituent requirements for the computer 270 are the same as those for a known computer. That is, the computer 270 has a central processing unit, a storage device, an input device, a display device, a printing device, and an output device. Further, constitutive processes for the CMM 100 may be automatically controlled by a program stored in the storage device, or each of functions of the constitutive processes may be semi-automatically or manually controlled as occasion demands.

The constitutive processes for the CMM 100 include error compensation of the CMM 100, collection of scanning probe data, calculation of error, display of error, functionalization of error, output of correction data, and so on.

Generally, information exchange between the computer 270 and the drive unit 260 is performed by wire communication through a transmission control procedure such as IEEE488. Alternatively, wireless communication, optical communication or the like may be used as occasion demands.

The scanning probe 118 can measure the position of the work continuously, so that contour data can be obtained easily densely at a high speed when a plurality of points in the work are measured. Hence, the scanning probe 118 is hardly influenced by the environmental change, so that there is the possibility that high accuracy measurement is made as a whole.

Such a scanning probe has been described in JP-A-5-256640 (see FIG. 8). In the probe, a stylus is supported through an X-axis slider, a Y-axis slider and a Z-axis slider which can move in respective directions perpendicular to a pedestal.

Slide portions between the pedestal and the three sliders are supplied with compressed air to form air bearings. Hence, a frictionless guide mechanism is formed.

The guide mechanism further includes three sensors, that is, a Z-axis sensor for detecting the displacement of the Z-axis slider relative to the pedestal, a Y-axis sensor for detecting the displacement of the Y-axis slider relative to the Z-axis slider, and an X-axis sensor for detecting the displacement of the X-axis slider relative to the Y-axis slider.

The three-dimensional displacement quantity of the stylus can be measured with the three sensors.

For example, an absolute optical linear scale is used as each of the sensors. When the scanning probe is moved relatively to a work in a direction of a surface of the work while the stylus (measurer) of the scanning probe is kept in contact with the surface of the work, the stylus is displaced along the contour of the surface of the work. Hence, contour data of the work can be collected continuously.

In this case, the values of the linear scales measuring displacement of the drive mechanisms of the CMM are synthesized with the three sensor outputs from the scanning probe to thereby obtain the contour data. Incidentally, when the stylus is not in contact with the work, the ordinary stop positions (restored positions) of the X-axis slider, the Y-axis slider and the Z-axis slider in the scanning probe are set as the origin positions of the absolute sensors respectively.

As described above, the scanning probe has such characteristic that data can be collected at a high speed. The scanning probe is however complex in structure compared with a touch signal probe because the scanning probe includes such guide mechanisms and such sensors. Hence, there is a problem that it is difficult to keep measuring accuracy sufficiently high.

These guide mechanisms cannot avoid occurrence of processing error, deformation caused by the environmental change and other error. As a result, the Z-axis slider, the Y-axis slider and the X-axis slider cannot be moved accurately, so that error is contained in the data indicating the displacement of the stylus measured with the Z-axis sensor, the Y-axis sensor and the X-axis sensor each measuring the displacement of the corresponding slider.

FIG. 9A is a typical view showing an example of the X-axis guide mechanism. For example, as shown in FIG. 9A, rolling of the X-axis slider around the X axis, pitching of the X-axis slider around the Y axis and yawing of the X-axis slider around the Z axis occur when the X-axis slider is displaced in the X-axis direction.

In addition to error caused by these rotational motions, straightness error is caused by the linearity of the motion of the X-axis guide mechanism. This error is classified into Y-axis straightness error caused by the displacement in the Y-axis direction and Z-axis straightness error caused by the displacement in the Z-axis direction when the X-axis slider is displaced in the X-axis direction.

In addition, in the X-axis sensor itself, measuring error for the displacement quantity (indication error) exists in the whole measurement region. That is, six kinds of errors per axis may be assumed. In addition to these errors, orthogonal error is caused by orthogonality. In the three-dimensional scanning probe, the orthogonal error is classified into three kinds of errors caused by the orthogonality between the X axis and the Y axis, the orthogonality between the Y axis and the Z axis and the orthogonality between the Z axis and the X axis. Hence, there is the possibility that at least 21 kinds of geometrical errors may occur in total.

That is, error (rotational error) caused by rotational motion is expressed by X-axis rolling error $A(x)$, Y-axis pitching error $A(y)$, Z-axis pitching error $A(z)$, X-axis pitching error $B(x)$, Y-axis rolling error $B(y)$, Z-axis yawing error $B(z)$, X-axis yawing error $C(x)$, Y-axis yawing error $C(y)$ and Z-axis rolling error $C(z)$ when A is rotation around the X axis, B is rotation around the Y axis and C is rotation around the Z axis.

Straightness error is expressed by Y-axis straightness error $X(y)$ in the X-axis direction, Z-axis straightness error $X(z)$ in the X-axis direction, X-axis straightness error $Y(x)$ in the Y-axis direction, Z-axis straightness error $Y(z)$ in the Y-axis direction, X-axis straightness error $Z(x)$ in the Z-axis direction and Y-axis straightness error $Z(y)$ in the Z-axis direction.

The measuring error is expressed by X-axis indication error $X(x)$, Y-axis indication error $Y(y)$ and Z-axis indication error $Z(z)$. Orthogonal error is expressed by orthogonal error Pyx between the Y axis and the X axis, orthogonal error Pzx between the Z axis and the X axis and orthogonal error Pzy between the Z axis and the Y axis.

These errors change the posture of the measurer supported through the guide mechanism to make it difficult to decide the accurate position of the measurer. As a result, measuring accuracy is deteriorated.

In the scanning probe, the quantity of change of the posture of the measurer varies in accordance with the length of the measurer even in the case where the guide mechanism is unchanged. Hence, when the measurer is exchanged for a new one different in length, measurement error varies even in the case where the scanning probe is unchanged. Generally, there is a tendency that measurement error increases as the length of the measurer used increases.

FIG. 9B typically shows the state of position error given to the contact ball 121 of the measurer 119 by rotation A around the X axis (X-axis rolling) It is obvious from FIG. 9B that an error of dY and an error of dZ are generated in the Y-axis direction and the Z-axis direction respectively.

Generally, these errors can be corrected by a function process given by the following equation:

$$C=F(s) \qquad (1)$$

in which s is a vector indicating the outputs of the X-axis sensor, the Y-axis sensor and the Z-axis sensor in the scanning probe, and C is a vector indicating coordinates (X,Y,Z) of the scanning probe after correction.

The equation (1) can be transformed into the following equation (1') by using a coordinate transformation matrix K.

$$C=K \cdot s \qquad (1')$$

That is, if coordinate transformation matrix K is obtained, the sensor outputs in the scanning probe can be corrected. In addition, probe vector P and correction ball size r need to be considered in the calibration of the scanning probe.

The probe vector P provides an offset from the reference position of the spindle to the central position of the contact ball 121 at the tip of the measurer. When the probe is exchanged for a new one, the same part program can be used regardless of difference in the probe if the probe vector is adapted to the new probe.

On the other hand, the correction ball size r provides the radius of the contact ball 121 at the tip of the measurer.

As described above, in the scanning probe, calibration is performed when the coordinate transformation matrix K, the probe vector P and the correction ball size r are obtained. Generally, as shown in FIG. 10, these calibrating works are performed as follows. The scanning probe 118 is attached to the forward end of the spindle 117 of the CMM (step 320).

Then, while the contact ball 121 of the scanning probe 118 is pressed against a reference sphere 120, manual preparatory measurement is performed at four or more points. The coordinates of a first center of the reference sphere 120 are calculated on the basis of coordinate values obtained by synthesizing outputs of the sensors of the scanning probe at respective measurement points (hereinafter referred to as sensor outputs) with outputs of the linear scales measuring the slider displacements of the drive mechanisms of the CMM (hereinafter referred to as linear scale outputs). For example, one arctic point and four equatorial points on the reference sphere are selected as the measurement points (step 330).

Then, a part program for measuring the reference sphere at points is generated by using unit vectors for the coordinates of the first center of the reference sphere 120, the radius (known) of the reference sphere, a temporary probe vector P (design value obtained on the basis of a probe design drawing), a temporary correction ball size r (design value obtained on the basis of the probe design drawing) and the coordinate transformation matrix K. On this occasion, the number of the measurement points is selected to be in a range of from about 200 to about 300. (Although this measurement can be performed manually, the part program is generally generated for performing this measurement automatically because a large measurement time is required for the manual measurement) (step 340).

Then, the part program for measuring the reference sphere at the points is executed to calculate the coordinates (sensor outputs and linear scale outputs) of the measurement points. The coordinates of a second center of the reference sphere 120 (more accurate than the coordinates obtained in the step 330) are calculated on the basis of the resulting coordinates of the measurement points. Further, the coordinate transformation matrix K is obtained (step 350).

Then, the probe vector P and the correction ball size r are obtained by use of the coordinate transformation matrix K (step 360).

The calibration process needs to be executed whenever the probe is exchanged for a new one or whenever the attachment posture of the probe is changed. Moreover, since the greatest care such as thorough temperature control is required for performing the process, even a skillful calibrating person requires a large amount of time to perform these calibration works, however, with the result that it is still impossible to always obtain sufficient calibration accuracy.

SUMMARY OF THE INVENTION

It is an object of the invention to provide a method for calibrating a scanning probe accurately and a computer-readable medium therefor.

To achieve the foregoing object, according to the invention, there is provided a method of calibrating a scanning probe, including: the preparatory measuring step of measuring a calibration reference with a scanning probe capable of measuring a work by scanning to thereby obtain first reference coordinates of the calibration reference; the calibration measuring step of generating a part program for measuring the calibration reference by using a coordinate transformation function for calibrating outputs of measuring sensors in the scanning probe and a probe vector for indicating an offset of a measurer in the scanning probe and executing the part program; the coordinate transformation function calibrating step of calculating a calibration value of the coordinate transformation function and second reference coordinates of the calibration reference on the basis of results measured by the calibration measuring step; the first probe vector calibrating step of calculating a calibration value of the probe vector on the basis of results calculated by the coordinate transformation function calibrating step; the re-execution step of re-executing the calibration measuring step and the coordinate transformation function calibrating step on the basis of results calculated by the coordinate transformation function calibrating step; and the second probe vector calibrating step of calculating a calibration value of the probe vector on the basis of results calculated by the coordinate transformation function calibrating step re-executed.

According to the invention, after approximate reference coordinates of the calibration reference are obtained by preparatory measurement, a part program for measuring the calibration reference is generated and executed. On the basis of a result thereof, a temporary coordinate transformation function and reference coordinates are once obtained. On the basis of results thereof, a part program is generated again and executed for measuring the calibration reference. On the basis of a result thereof, a coordinate transformation function and reference coordinates are obtained again. Hence, the resulting calibration reference measured by the second part program is more accurate than the resulting calibration reference measured by the first part program.

Hence, the coordinate transformation function and the probe vector can be obtained more accurately, so that accuracy in calibrating the scanning probe is improved.

Further, according to the invention, there is provided a method of calibrating a scanning probe, including: the preparatory measuring step of measuring a calibration reference with a scanning probe capable of measuring a work by scanning to thereby obtain first reference coordinates of the calibration reference; the calibration measuring step of generating a part program for measuring the calibration reference by using a coordinate transformation function for calibrating outputs of measuring sensors in the scanning probe and a probe vector for indicating an offset of a measurer in the scanning probe and executing the part program; the coordinate transformation function calibrating step of calculating a calibration value of the coordinate transformation function and second reference coordinates of the calibration reference on the basis of results measured by the calibration measuring step; the probe vector calibrating step of calculating a calibration value of the probe vector on the basis of results calculated by the coordinate transformation function calibrating step; the re-execution step of re-executing the calibration measuring step and the coordinate transformation function calibrating step by a plurality of times while changing either of scanning speed of the scanning probe and relative distance between the scanning probe and the calibration reference; and the storage step of storing results calculated by the coordinate transformation function calibrating step executed by the plurality of times in accordance with either of the scanning speed and the relative distance.

According to the invention, after approximate reference coordinates of the calibration reference are obtained by preparatory measurement, a part program for measuring the calibration reference is generated and executed so that a calibration value of a coordinate transformation function is obtained on the basis of a result thereof. On this occasion, generation and execution of the part program for calculating the calibration value is performed by a plurality of times in the condition that either scanning speed or relative distance between the scanning probe and the calibration reference (pushing-down quantity in the case of a contact type probe) is changed whenever the calibration value is calculated.

As a result, the coordinate transformation function and the probe offset can be obtained in accordance with the different scanning speed or pushing-down quantity.

In practical scanning measurement of a work, if the coordinate transformation function and the probe offset in accordance with the nearest scanning speed or pushing-down quantity are used, error compensation can be made more accurately.

Preferably, in the probe vector calibrating step, a calibration value of the probe vector is calculated on the basis of re-measured results of the calibration reference by using results calculated by the coordinate transformation function calibrating step re-executed.

In this configuration, the calibration reference can be re-measured accurately by use of the coordinate transformation function and the reference coordinates obtained more accurately. Hence, the probe offset can be obtained more accurately.

According to the invention, there is provided a method of calibrating a scanning probe, including: the conversion step of converting a coordinate transformation function for calibrating outputs of measuring sensors of the scanning probe and a probe vector for indicating an offset of a measurer of the scanning probe when the posture of attachment of the scanning probe for measuring a work by scanning to a measuring apparatus is changed; the calibration measuring step of generating a part program for measuring a calibration reference by using the converted coordinate transformation function and the converted probe vector and executing the part program to thereby perform calibration measurement; the coordinate transformation function calibrating step of calculating a calibration value of the converted coordinate transformation function and reference coordinates of the calibration reference on the basis of results measured by the calibration measuring step; and the probe vector calibrating step of calculating a calibration value of the converted probe vector on the basis of results calculated by the coordinate transformation function calibrating step.

According to the invention, when the attachment posture of the scanning probe is changed, the coordinate transformation function and the probe vector before the change of the posture are converted in accordance with the quantity of change of the posture. On the basis of results thereof, a part program for measuring the calibration reference is generated and executed. Further, on the basis of results thereof, the coordinate transformation function and the reference coordinates are obtained. Hence, even in the case where calibration measurement is performed only once after the change of the posture, the coordinate transformation function and the reference coordinates can be obtained accurately. The calibration value of the probe offset is also accurate.

Hence, even in the case where the scanning probe needs to be calibrated accurately, the setup time for measuring the work is shortened because the calibration time can be shortened. Hence, measurement efficiency is improved as a whole.

Preferably, in the probe vector calibrating step, a calibration value of the converted probe vector is calculated on the basis of re-measured results of the calibration reference by using results calculated by the coordinate transformation function calibrating step.

In this configuration, the calibration reference can be measured accurately by use of the coordinate transformation function and the reference coordinates obtained more accurately. Hence, the calibration value of the probe vector can be calculated accurately.

Preferably, the coordinate transformation function has a form of the product of the measuring sensor outputs and a coordinate transformation matrix. In this configuration, calculation can be made easily.

Preferably, the scanning probe is a contact type scanning probe and the probe vector calibrating step includes the step of calculating the radius of a contactor of the contact type scanning probe.

In this configuration, the offset from the surface of the work to the center of the measurer can be obtained exactly in practical measurement.

Preferably, the calibration reference is a ball and the reference coordinates are the coordinates of the center of the ball.

In this configuration, the scanning probe can be calibrated extremely accurately by use of a ball which can be high-accuracy-processed easily.

Preferably, the method of calibrating a scanning probe according to the invention is provided in the form of a calibration program executed by a computer. In this configuration, for example, an inexpensive general-purpose computer can be used so that the program is easily executed by the computer. Hence, promotion of use of the invention can be attained greatly.

BRIEF DESCRIPTION OF THE DRAWINGS

FIG. 10 is a flow chart showing a method for calibrating a scanning probe in the related art.

DESCRIPTION OF THE PREFERRED EMBODIMENTS

Figure 1:
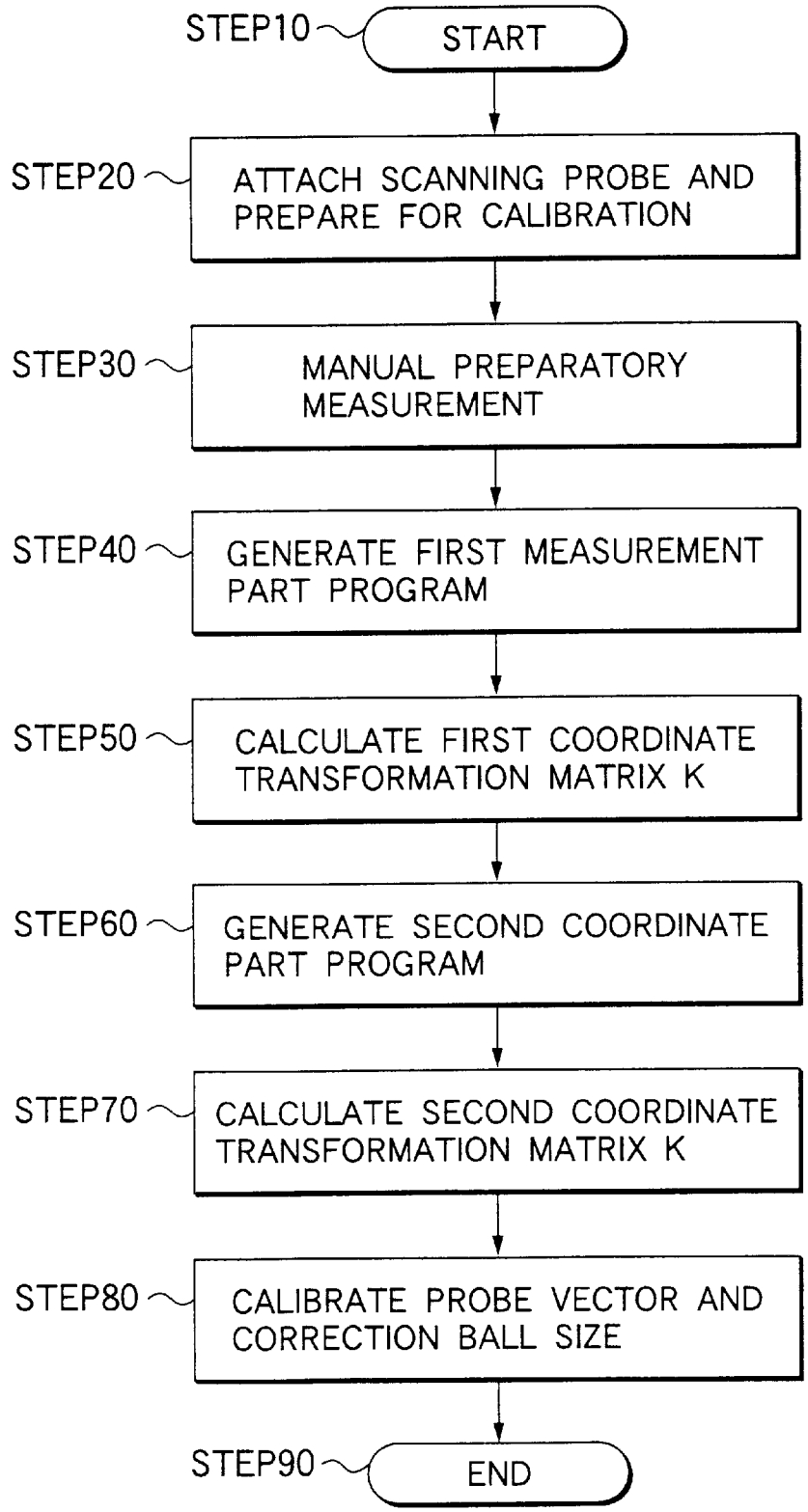
FIG. 1 is a flow chart showing a calibrating method according to a first embodiment of the invention.

Preferred embodiments of the invention will be described below with reference to the drawings. In the drawings, like numerals refer to like parts. FIG. 1 shows a method for calibrating a scanning probe according to a first embodiment of the invention. First, a processing starts in step 10. Then, a scanning probe 118 is attached to a forward end of a spindle 117 in a coordinate Measuring Machine (Hereinafter, referred to CMM). A radius (calibrated and known) of a reference sphere, a temporary probe vector P (design value obtained on the basis of a probe design drawing), a temporary correction ball size r (design value obtained on the basis of the probe design drawing), etc. are input into a computer 270 to prepare for calibration (step 20).

Then, while a contact ball 121 of the scanning probe 118 is pressed against a reference sphere 120, manual preparatory measurement is performed at four or more points. The coordinates of a first center of the reference sphere 120 are calculated on a basis of coordinate values obtained by synthesizing outputs of sensors of the scanning probe at respective measurement points with outputs of linear scales measuring the displacement of the drive mechanism of the CMM. For example, one arctic point and four equatorial points on the reference sphere 120 are selected as the measurement points (step 30).

Then, a first part program for measuring the reference sphere at points is generated by using unit vectors for the coordinates of the first center of the reference sphere 120, the radius (known) of the reference sphere, the temporary probe vector P (design value obtained on the basis of a probe design drawing), the temporary correction ball size r (design value obtained on the basis of the probe design drawing) and the coordinate transformation matrix K. On this occasion, the number of the measurement points is selected to be in a range of from about 200 to about 300 (step 40).

Then, the first part program for measuring the reference sphere at the points is executed to calculate the coordinates (sensor outputs and linear scale outputs) of the measurement points. The coordinates of a second center of the reference sphere 120 (more accurate than the coordinates obtained in the step 30) are calculated on the basis of the resulting coordinates of the measurement points. At the same time, the first coordinate transformation matrix K is obtained (step 50).

Then, a second part program for measuring the reference sphere at points is generated by use of the coordinates of the second center of the reference sphere 120 and the first coordinate transformation matrix K. On this occasion, the number of the measurement points is selected to be in a range of from about 50 to about 100 (step 60).

Then, the second part program for measuring the reference sphere at points is executed to calculate the coordinates of the measurement points and the second coordinate transformation matrix K again (step 70).

Then, the reference sphere 120 is measured at four or more points by use of the second coordinate transformation matrix K to thereby calculate the coordinates of a third center of the reference sphere 120 (more accurate than the coordinates obtained in the step 50), the probe vector and the correction ball size. Incidentally, measurement in this step may be performed manually or may be performed automatically by use of a generated part program. Automatic measurement is more accurate than manual measurement (step 80).

Then, the processing is terminated in step 90.

The first embodiment shown in FIG. 1 has the following effects.

(1) After the first coordinate transformation matrix K is obtained by first measurement based on the first measurement part program using the coordinate transformation matrix K expressed by unit vector, the second coordinate transformation matrix K is obtained by second measurement based on the second measurement part program using the first coordinate transformation matrix K. Hence, error of the coordinate transformation matrix K is reduced, so that accuracy in calibrating the scanning probe on the basis of the second coordinate transformation matrix K is improved.

(2) Calibration measurement is performed again by use of the second coordinate transformation matrix K reduced in error to thereby obtain calibration values of the coordinates of the center of the reference sphere 120, the probe vector and the correction ball size. Hence, errors of the calibration values are reduced, so that total accuracy in calibrating the scanning probe is improved more greatly.

Figure 2:
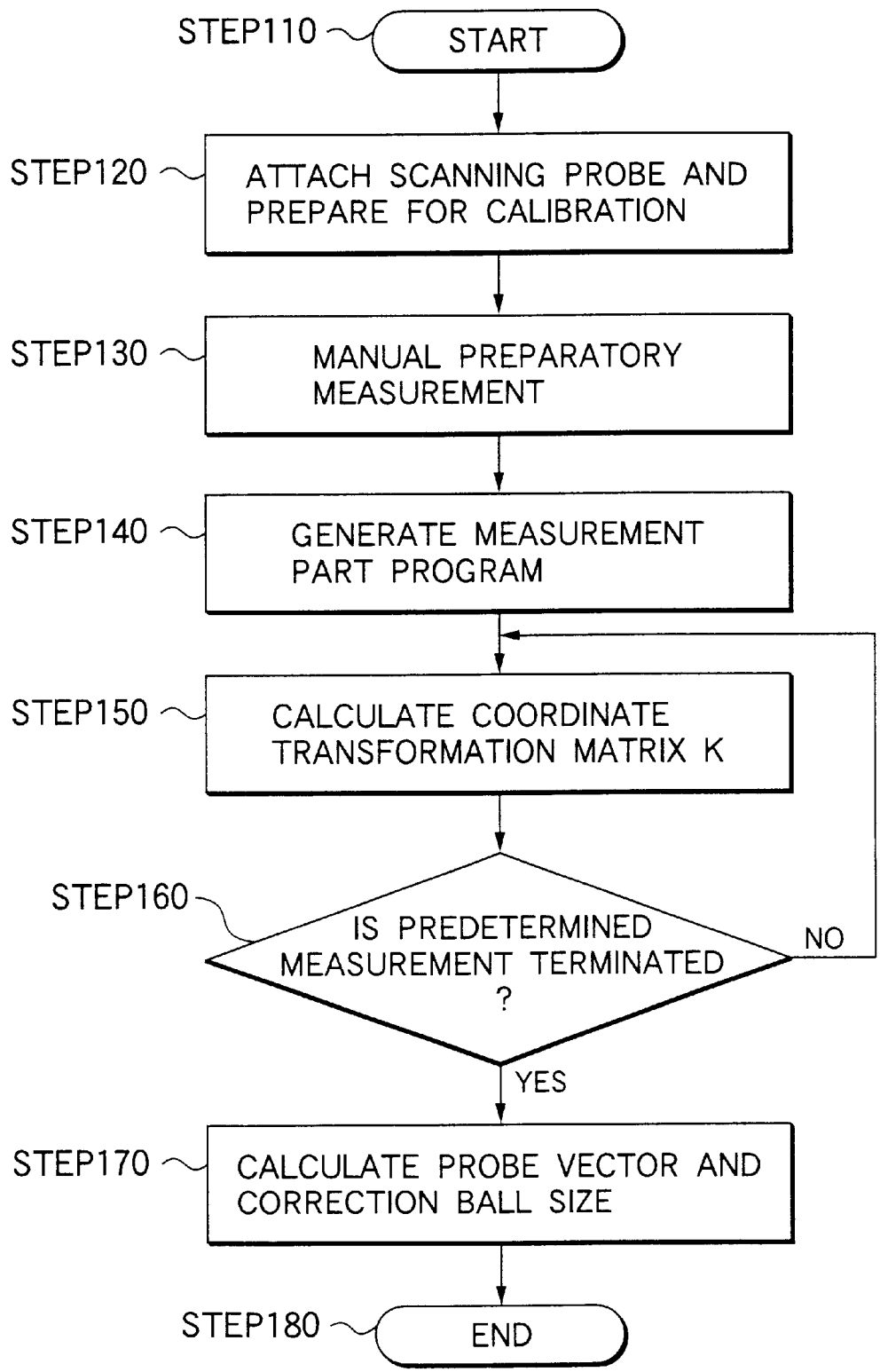
FIG. 2 is a flow chart showing a calibrating method according to a second embodiment of the invention.

FIG. 2 shows a method for calibrating a scanning probe according to a second embodiment of the invention. Steps 110, 120 and 130 in FIG. 2 are equivalent to the steps 10, 20 and 30 in the first embodiment shown in FIG. 1 and the description thereof will be therefore omitted.

Figure 3:
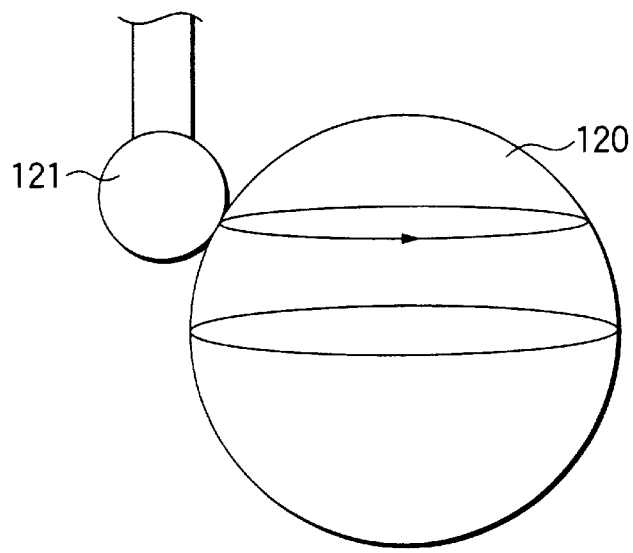
FIG. 3 is a view for explaining the calibrating method according to the second embodiment of the invention.

In step 140, a part program for measuring the reference sphere by scanning is generated by use of the coordinates of the first center of the reference sphere 120, the radius (known) of the reference sphere, the temporary probe vector P (design value obtained on the basis of a probe design drawing) and the temporary correction ball size r (design value obtained on the basis of the probe design drawing) and by use of the coordinate transformation matrix K expressed by unit vector. In this measurement, a scanning orbit is circular because the reference sphere 120 is spherical. For example, the scanning orbit is an orbit shown in FIG. 3. On this occasion, the orbit is selected so that the pushing-down quantity of the contact ball 121 with respect to the reference sphere 120 takes a predetermined value (for example, 0.1 mm, 0.2 mm, or the like). Measurement points in this case are taken at regular intervals of a distance or time on the orbit. For example, about 100 points per circle are taken on the orbit. The circumferential speed at which the contact ball 121 moves on this orbit is set at a predetermined speed (for example, 0.25 mm/sec, 0.5 mm/sec or the like). Incidentally, measurement is preferably performed on a plurality of longitudes of the reference sphere.

Then, in step 150, the part program for measuring the reference sphere by scanning is executed with the predetermined pushing-down quantity at the predetermined circumferential speed to thereby obtain the coordinates of the measurement points (sensor outputs and linear scale outputs). From results of the measurement, the coordinates of the center of the reference sphere 120 and the coordinate transformation matrix K are obtained. The coordinates of the center of the reference sphere 120 and the coordinate transformation matrix K are calculated and stored as values peculiar to the pushing-down quantity and the circumferential speed.

Then, in step 160, a judgment is made as to whether all measurement with the predetermined pushing-down quantity at the predetermined circumferential speed is completed or not.

When all measurement is not completed, the step 150 is re-executed after either the pushing-down quantity or the circumferential speed is changed. As for the pushing-down quantity and the circumferential speed, a constant pushing-down quantity and a plurality of circumferential speeds may be used or a constant circumferential speed and a plurality of pushing-down quantities may be used. Alternatively, a plurality of different combinations each constituted by a pushing-down quantity and a circumferential speed may be used.

In short, any combination of a pushing-down quantity and a circumferential speed may be used in the step 150 if the coordinates of the center of the reference sphere 120 and the coordinate transformation matrix K can be calculated and stored as values peculiar to the combination of the pushing-down quantity and the circumferential speed.

When the predetermined measurement is completed in the step 160, the next step 170 is executed.

In the step 170, the coordinates of the center of the reference sphere 120, the probe vector and the correction ball size are calculated on the basis of measurement of the reference sphere 120 at four or more points by use of the respective coordinate transformation matrices K stored in the step 150. The coordinates of the center of the reference sphere 120, the probe vector and the correction ball size are calculated and stored as values peculiar to the pushing-down quantity and the circumferential speed.

Incidentally, measurement processing in this step may be performed manually or may be performed automatically by use of a generated part program. Generally, because a plurality of combinations of pushing-down quantity and circumferential speed are used, automatic measurement is more efficient and more accurate. Then, the processing is terminated in step 180.

The second embodiment shown in FIG. 2 has the following effect in addition to the effect (2) in the first embodiment.

(3) When calibration measurement is performed by a predetermined combination of a pushing-down quantity and a circumferential speed while the circumference of the reference sphere is measured on a circular orbit by scanning, the coordinates of the center of the reference sphere, the coordinate transformation matrix K, the probe vector and the correction ball size are calculated as calibration values peculiar to the combination of the pushing-down quantity and the circumferential speed. Hence, in practical scanning measurement, the scanning probe can be calibrated by use of calibration values peculiar to the nearest values to the pushing-down quantity and the circumferential speed. Hence, accuracy in calibration is improved.

A method for calibrating a scanning probe according to a third embodiment of the invention will be described below with reference to FIG. 4. The method for calibrating a scanning probe according to the third embodiment is provided to attain simplification of the calibrating operation when the attachment posture of the scanning probe attached to a forward end of the spindle 117 in the CMM is changed.

Figure 4:
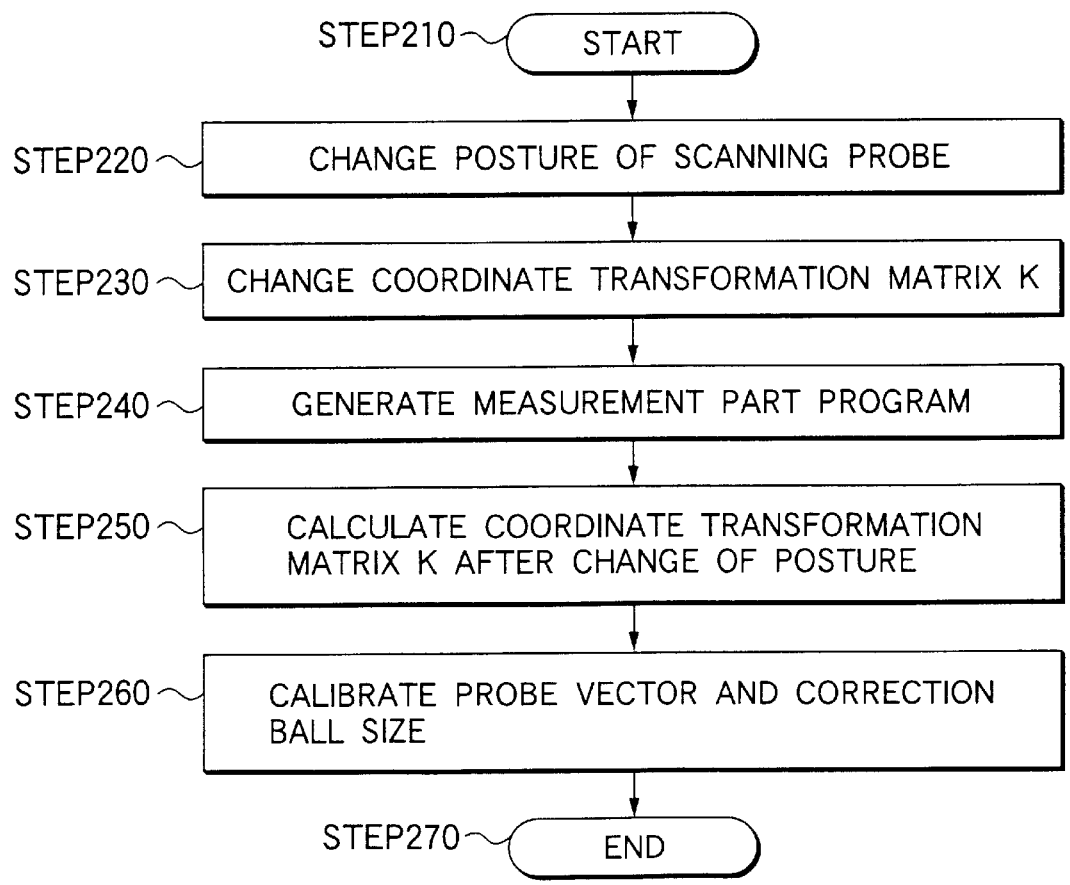
FIG. 4 is a flow chart showing a calibrating method according to a third embodiment of the invention.
Figure 5A:
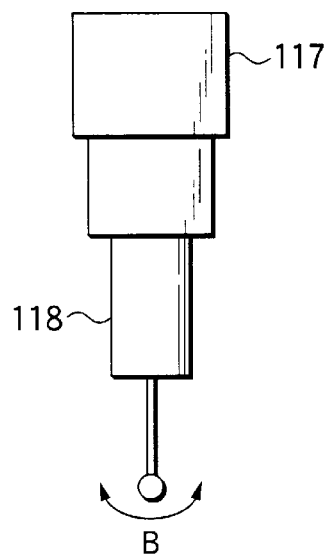
FIGS. 5A and 5B are views for explaining the calibrating method according to the third embodiment of the invention.
Figure 5B:
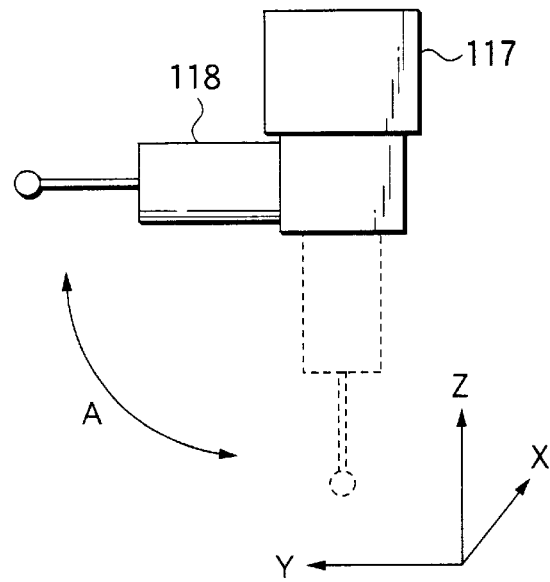
Figure 6:
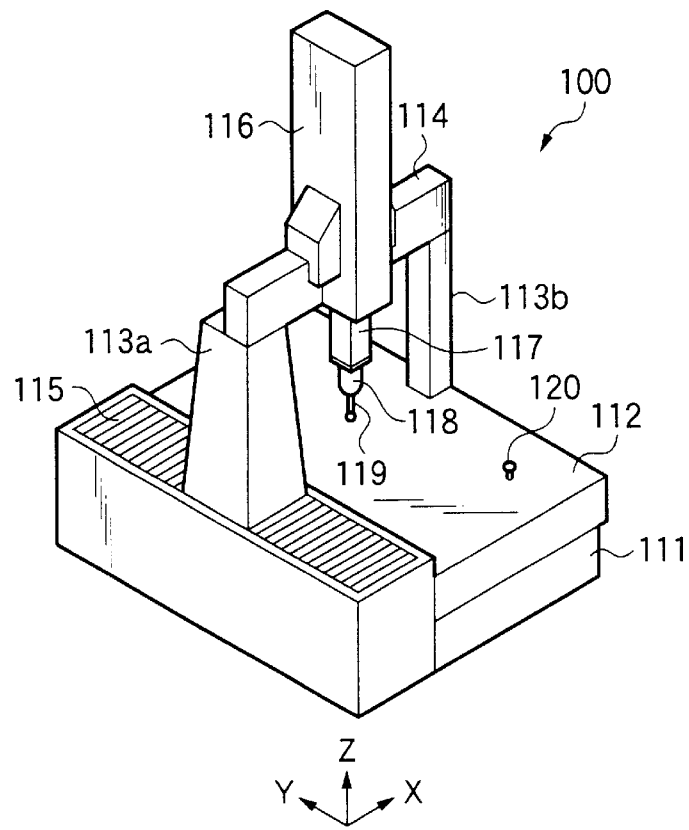
FIG. 6 is a perspective view of a coordinate Measuring Machine for carrying out the invention.
Figure 7:
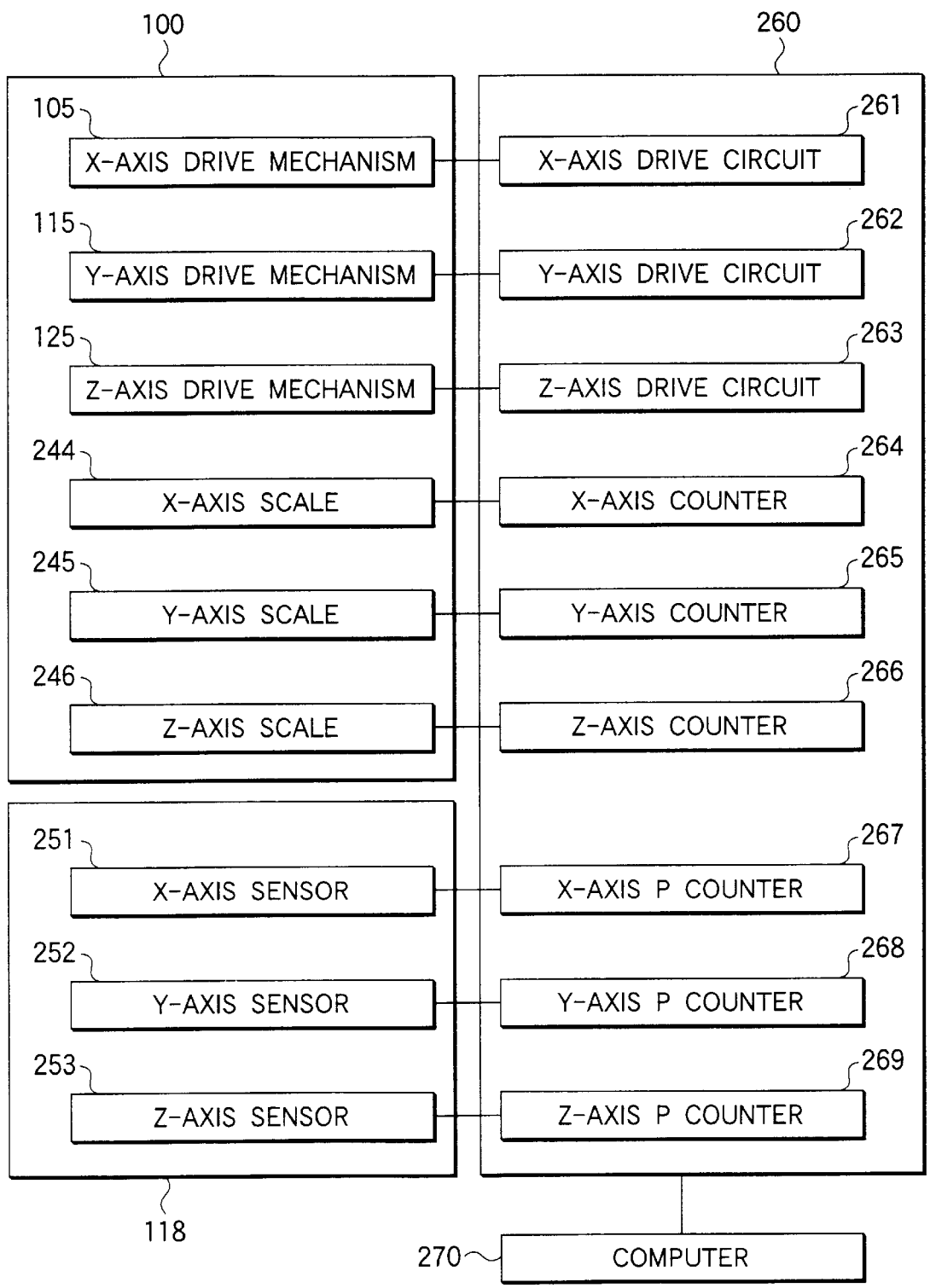
FIG. 7 is a block diagram of the three-dimensional measuring system.
Figure 8:
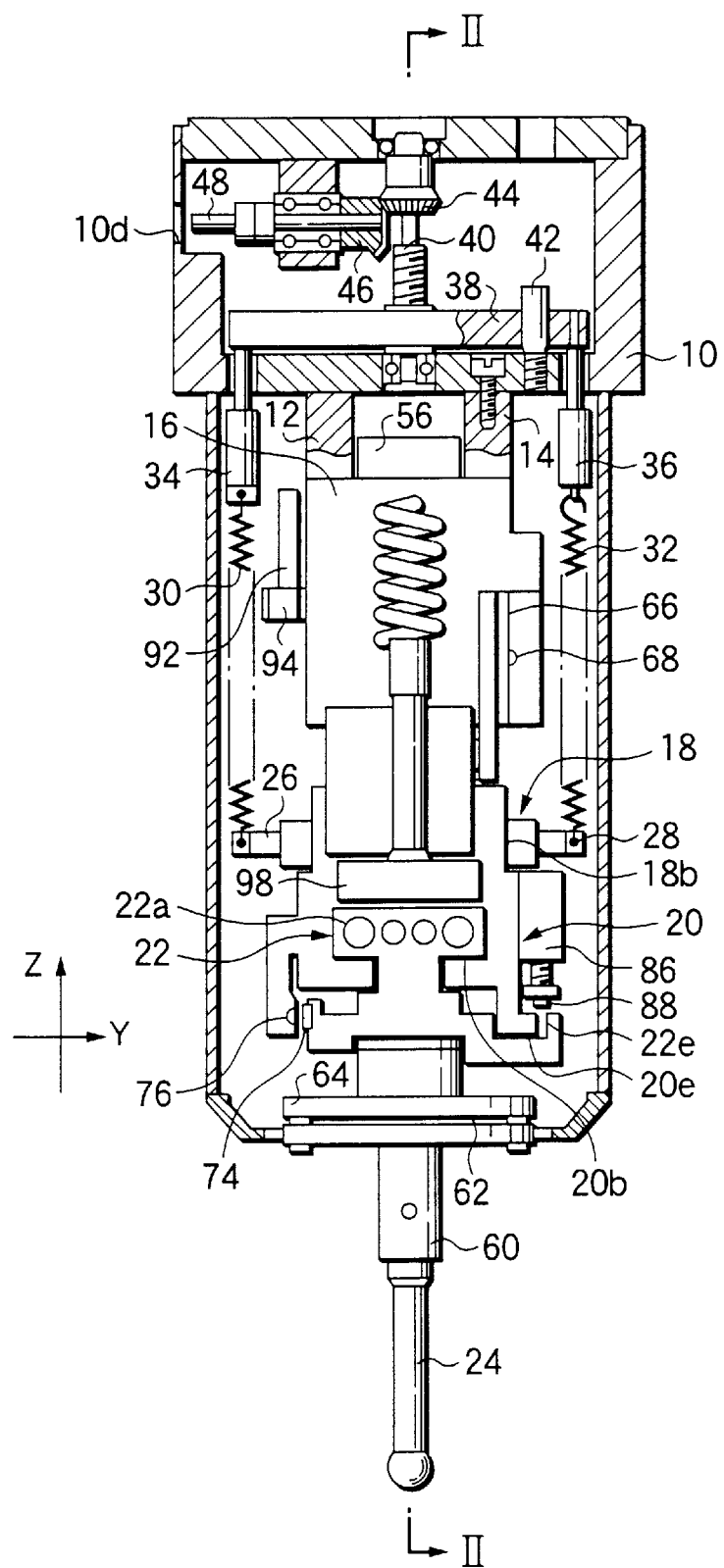
FIG. 8 is a sectional view of a scanning probe for carrying out the invention.
Figure 9A:
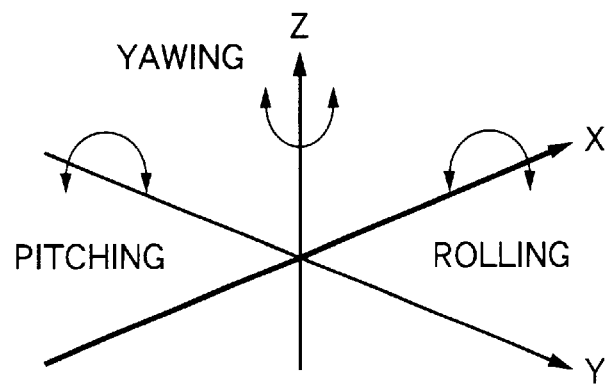
FIGS. 9A and 9B are typical views showing rotation error of the scanning probe.
Figure 9B:
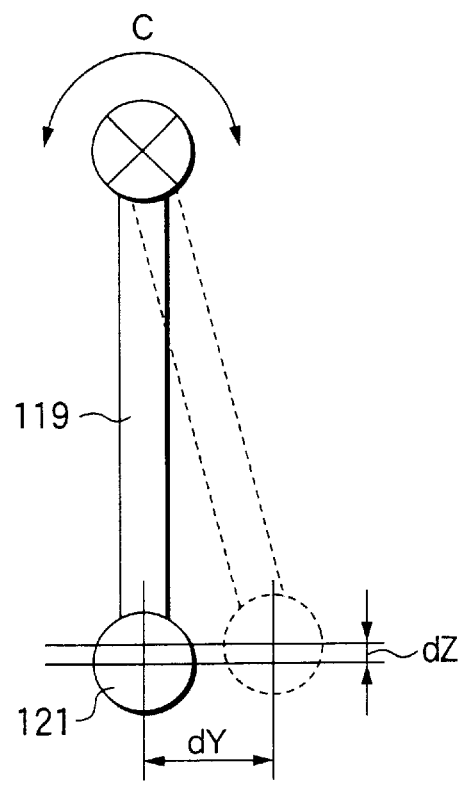

For example, the change of the attachment posture of the scanning probe may be rotation in an XY plane as shown in FIG. 5A, rotation in a YZ plane as shown in FIG. 5B, rotation in an XZ plane or combination thereof. When the posture of the scanning probe is changed in this manner, calibration is performed by the procedure shown in FIG. 4.

First, the processing starts in step 210. This processing is executed in the condition that the coordinate transformation matrix K in a reference posture of the scanning probe (generally, the rotation angle in each of the XY plane, the YZ plane and the XZ plane is zero), the coordinates of the center of the reference sphere 120, the radius of the reference sphere, the probe vector P and the correction ball size r are obtained because calibration in the reference posture of the scanning probe has been already performed in the related art or the first embodiment of the invention.

Then, the posture of the scanning probe attached to the spindle is changed. The change of the posture may be performed manually or may be performed automatically (step 220). Then, the coordinate transformation matrix K in the reference posture is changed in accordance with the change of the posture (step 230).

For example, in the case of rotation in the XY plane as shown in FIG. 5A, the coordinate transformation matrix Kc after the change of the posture can be calculated by the following expression (1) with respect to the coordinate transformation matrix K before the change of the posture.

$$[Kc] = \begin{bmatrix} CosB & -SinB & 0 \\ SinB & CosB & 0 \\ 0 & 0 & 1 \end{bmatrix}[K] \quad (1)$$

In the case of rotation in the YZ plane as shown in FIG. 5B, the coordinate transformation matrix Kc after the change of the posture can be calculated by the following expression (2) with respect to the coordinate transformation matrix K before the change of the posture.

$$[Kc] = \begin{bmatrix} 1 & 0 & 0 \\ 0 & CosA & SinA \\ 0 & -SinA & CosA \end{bmatrix}[K] \quad (2)$$

When both rotations shown in FIGS. 5A and 5B are given, the coordinate transformation matrix Kc after the change of the posture can be calculated by the following expression (3) with respect to the coordinate transformation matrix K before the change of the posture.

$$[Kc] = \begin{bmatrix} CosB & -SinB & 0 \\ SinB & CosB & 0 \\ 0 & 0 & 1 \end{bmatrix}\begin{bmatrix} 1 & 0 & 0 \\ 0 & CosA & SinA \\ 0 & -SinA & CosA \end{bmatrix}[K] \quad (3)$$

Further, the probe vector Pc after the change of the posture is calculated in the same manner as described above, with respect to the probe vector P before the change of the posture.

After the coordinate transformation matrix Kc and the probe vector Pc in accordance with the change of the posture are calculated as described above, a part program for measuring the reference sphere at points is generated by using the coordinate transformation matrix Kc, the probe vector Pc, the coordinates of the center of the reference sphere 120, the radius of the reference sphere and the correction ball size r. On this occasion, the number of the measurement points is selected to be in a range of from about 200 to about 300 (step 240).

Then, the part program for measuring the reference sphere at points is executed to calculate the coordinates of the measurement points (sensor outputs and linear scale outputs). From results of the calculation, the coordinates of the second center of the reference sphere 120 are obtained and the second coordinate transformation matrix Kc after the change of the posture is obtained (step 250).

After that, the processing in steps 260 and 270 is equivalent to that in the steps 80 and 90 in the first embodiment and the description thereof will be therefore omitted.

The third embodiment shown in FIG. 4 has the following effect in addition to the effect (2) in the first embodiment.

(4) The coordinate transformation matrix K and the probe vector P in the reference posture are changed in accordance with the quantity of change of the posture so as to be used for measuring the reference sphere. Hence, accuracy in calibration is improved greatly compared with the case where a unit vector is used.

Although preferred embodiments of the invention have been described by way of example, the invention is not limited thereto and changes may be made without departing from the gist of the invention.

For example, although the first embodiment shown in FIG. 1 has been described upon the case where measurement of the reference sphere is repeated twice, the invention may be also applied to the case where measurement is repeated three times. In this case, the scanning probe can be calibrated more accurately. Although the second embodiment shown in FIG. 2 has been described upon the case where the reference sphere is measured by once, the invention may be also applied to the case where measurement is repeated by twice or more. In this case, the scanning probe can be calibrated more accurately.

Although the respective embodiments have been described upon the case where a contact type scanning probe is used, the invention may be also applied to the case where a non-contact type scanning probe is used.

Although description has been made upon the case where the coordinate transformation matrix is used for correcting outputs of the measuring sensors of the scanning probe, the invention may be also applied to the case where a general function is used for correcting outputs of the measuring sensors.

Although description has been made upon the case where a reference sphere is used as the calibration reference, the invention may be also applied to the case where an accurately processed gage block or the like is used. Although description has been made upon the case where a CMM is used as the measuring apparatus, accurate calibration can be performed by the invention when the invention is applied to a contact type or non-contact type scanning probe used in another measuring apparatus such as a contour measuring apparatus, a roundness measuring machine or an vision measuring machine.

As described above, in accordance with the invention, the scanning probe can be calibrated accurately.

What is claimed is:

1. A method of calibrating a scanning probe, comprising:
    a preparatory measuring step of measuring a calibration reference with a scanning probe capable of measuring a work by scanning to thereby obtain first reference coordinates of said calibration reference;
    a calibration measuring step of generating a part program for measuring said calibration reference by using a coordinate transformation function for calibrating outputs of measuring sensors in said scanning probe and a probe vector for indicating an offset of a measurer in said scanning probe and executing said part program;
    a coordinate transformation function calibrating step of calculating a calibration value of said coordinate transformation function and second reference coordinates of said calibration reference on the basis of results measured by said calibration measuring step;
    a probe vector calibrating step of calculating a calibration value of said probe vector on the basis of results calculated by said coordinate transformation function calibrating step;
    a re-execution step of re-executing said calibration measuring step and said coordinate transformation function calibrating step by a plurality of times while changing at least one of scanning speed of said scanning probe and relative distance between said scanning probe and said calibration reference; and
    a storage step of storing results calculated by said coordinate transformation function calibrating step executed by said plurality of times in accordance with one of said scanning speed and said relative distance.

2. A method of calibrating a scanning probe, comprising:
    a conversion step of converting a coordinate transformation function for calibrating outputs of measuring sensors in said scanning probe and a probe vector for indicating an offset of a measurer in said scanning probe when a posture of attachment of said scanning probe measuring a work to a measuring machine by scanning is changed;
    a calibration measuring step of generating a part program for measuring a calibration reference by using said converted coordinate transformation function and said converted probe vector and executing said part program to thereby perform calibration measurement;
    a coordinate transformation function calibrating step of calculating a calibration value of said converted coordinate transformation function and reference coordinates of said calibration reference on the basis of results measured by said calibration measuring step; and
    a probe vector calibrating step of calculating a calibration value of said converted probe vector on the basis of results calculated by said coordinate transformation function calibrating step.

3. The method of calibrating a scanning probe according to claim 2, further comprising:
    a step of calculating a calibration value of said converted probe vector on a basis of re-measured results of said calibration reference by using results calculated by said coordinate transformation function calibrating step.

4. A method of calibrating a scanning probe, comprising:
    a preparatory measuring step of measuring a calibration reference with a scanning probe capable of measuring a work by scanning to thereby obtain first reference coordinates of said calibration reference;
    a calibration measuring step of generating a part program for measuring said calibration reference by using a coordinate transformation function for calibrating outputs of measuring sensors in said scanning probe and a probe vector for indicating an offset of a measurer in said scanning probe and executing said part program;
    a coordinate transformation function calibrating step of calculating a calibration value of said coordinate transformation function and second reference coordinates of said calibration reference on the basis of results measured by said calibration measuring step;
    a first probe vector calibrating step of calculating a calibration value of said probe vector on the basis of results calculated by said coordinate transformation function calibrating step;
    a re-execution step of re-executing said calibration measuring step and said coordinate transformation function calibrating step on the basis of results calculated by said coordinate transformation function calibrating step; and
    a second probe vector calibrating step of calculating a calibration value of said probe vector on the basis of results calculated by said coordinate transformation function calibrating step re-executed.

5. The method of calibrating a scanning probe according to claim 4, further comprising:
    a step of calculating a calibration value of said probe vector on the basis of re-measured results of said calibration reference by using results calculated by said coordinate transformation function calibrating step re-executed.

6. The method of calibrating a scanning probe according to claim 4, wherein said coordinate transformation function has a form of a product of said measuring sensor outputs and a coordinate transformation matrix.

7. The method of calibrating a scanning probe according to claim 4, wherein said scanning probe is a contact type scanning probe, and wherein said probe vector calibrating step includes the step of calculating the radius of a contactor of said contact type scanning probe.

8. The method of calibrating a scanning probe according to claim 4, wherein said calibration reference is a ball and said reference coordinates are coordinates of a center of said ball.

9. A computer-readable medium through which a method of calibrating a scanning probe according to claim 4 is executed by a computer.

* * * * *

UNITED STATES PATENT AND TRADEMARK OFFICE
CERTIFICATE OF CORRECTION

PATENT NO. : 6,701,268 B2
DATED : March 2, 2004
INVENTOR(S) : Noda et al.

It is certified that error appears in the above-identified patent and that said Letters Patent is hereby corrected as shown below:

<u>Title page,</u>
Item [57], ABSTRACT,
Line 2, delete "apart" and insert -- a part --.

Signed and Sealed this

Thirteenth Day of April, 2004

JON W. DUDAS
*Acting Director of the United States Patent and Trademark Office*